United States Patent
Cho

(10) Patent No.: US 7,150,817 B2
(45) Date of Patent: Dec. 19, 2006

(54) WATER TREATMENT-APPARATUS USING ION HAVING DRAIN HOLE

(76) Inventor: Tea-Hyun Cho, 745-95, Ua-dong 3ga, Deokjin-gu, 561-826 Jeonju-city, Jeonlabuk-do (KR)

( * ) Notice: Subject to any disclaimer, the term of this patent is extended or adjusted under 35 U.S.C. 154(b) by 0 days.

(21) Appl. No.: 10/532,170

(22) PCT Filed: Oct. 22, 2003

(86) PCT No.: PCT/KR03/02229

§ 371 (c)(1),
(2), (4) Date: Apr. 20, 2005

(87) PCT Pub. No.: WO2004/037728

PCT Pub. Date: May 6, 2004

(65) Prior Publication Data

US 2006/0011557 A1    Jan. 19, 2006

(30) Foreign Application Priority Data

Oct. 22, 2002  (KR) .................... 10-2002-0064599

(51) Int. Cl.
*C02F 1/02*   (2006.01)
(52) U.S. Cl. ...................... 204/660; 204/670

(58) Field of Classification Search ............... 204/660, 204/667, 670
See application file for complete search history.

(56) References Cited

U.S. PATENT DOCUMENTS 5,447,626 A * 9/1995 Ido .......................... 204/665
5,480,522 A   1/1996 Ibbott

FOREIGN PATENT DOCUMENTS

KR        0179897         4/2000
KR    1020000021182 A    4/2000

* cited by examiner

*Primary Examiner*—Roy King
*Assistant Examiner*—William T. Leader
(74) *Attorney, Agent, or Firm*—Renner, Otto, Boisselle and Sklar, LLP

(57) ABSTRACT

Disclosed is a water treatment apparatus capable of purifying water by means of ionization and activation of the water passing through tubular objects under an electric field and cleansing the interior of the tubular objects through which the water passes. The water treatment apparatus of the invention is preferably uses ions, and has a metal casing provided with at least one drain hole for naturally discharging condensed water, which is generated and accumulated between the metal casing and a housing, to the outside.

4 Claims, 7 Drawing Sheets

WATER TREATMENT-APPARATUS USING ION HAVING DRAIN HOLE

TECHNICAL FIELD

The present invention relates to a water treatment apparatus which can purify water by means of ionization and activation of the water passing through tubular objects under an electric field and cleanse the interior of the tubular objects through which the water passes, and more particularly to a water treatment apparatus using ions which has a metal casing provided with at least one drain hole for naturally discharging condensed water, which is generated and accumulated between the metal casing and a housing, to the outside.

BACKGROUND ART

Generally, in case of such tubular objects through which the water passes, such as a water service pipe, feed and drain pipes of a water tank, and so forth, while the tubular objects are used for a long time, active oxygen in water reacts with ferreous components of the tubular objects, so that the interior of the tubular objects is not only corroded to generate rust, but is deposited with such rust, foreign matters and so on. In other words, the interior of the tubular objects generates scales, slimes, slurries and so forth, and thus the tubular objects have a shortened service life span and interrupt the flow of the water. Further, the water passing through these tubular objects contains various kinds of matters harmful to a human body, such as iron oxides, impurities, germs, etc., so that such water is not sanitary.

In order to eliminate this insanitary factor of the tubular objects, a cleansing tool, for example a brush, is introduced into the interior of the tubular objects to remove rust, scales and so on. Alternatively, the tubular objects having the interior corroded may be exchanged with new ones. In this manner, the insanitary factor of the interior of the tubular objects is removed. However, this method allows the insanitary factor to be removed, but has an inefficiency problem in that in the course of cleansing or exchanging the tubular objects, relatively much time, labor power, equipment are required along with high cost.

Further, a method for treating water using a pipe cleanser or a high frequency generator has been used to extend a life span and an insanitary factor of the tubular objects. However, the method using the pipe cleanser incurs another problem according to use of chemicals. Further, an apparatus requiring power, such as the high frequency generator, requires consumption of energy and complicated equipment.

For this reason, recently, in industrial sites, there has been used a water treatment apparatus, which is non-powered, environmentally-friendly and simply equipped/installed, having an electrostatic generator to generate static electricity so as to ionize water with an electrostatic field, thereby purifying water using the ionization and simultaneously cleansing the inside of the tubular objects.

A water treatment apparatus having an electrostatic generator which is mounted to the tubular objects and purifies water and cleanses the inside of the tubular objects using ions as above is disclosed in Korean Patent No. 0312152. In terms of this water treatment apparatus, referring to FIG. 1, the water treatment apparatus includes an electrostatic generator 10 that generates an electrostatic field by contact friction with water by allowing the water to flow through, a thermal insulator pipe 20 into which the electrostatic generator 10 is inserted and isolates internal and external heat transmission to prevent deterioration in performance of the electrostatic generator 10 according to generation of moisture, closures 30 that prevents water from being introduced into the thermal insulator pipe 20, a housing 400 into which the thermal insulator pipe 20 and the closures 30 are inserted, housing connectors 450 coupled to both sides of the housing 40 and simultaneously to a tubular object. The water treatment apparatus having this electrostatic generator 10 further comprises a metal casing 50 as shown in FIG. 2, for protecting the housing 40 molded out of copper and other components inserted into the housing 40, and completely isolating heat transmission from the outside.

The electrostatic generator 10 is fixed to pipes 15 and 15' by forming carbon, copper, etc. either into a rod 12 or tube 12' or into a cylindrical structure provided with a plurality of inside holes in order to increase a contact area with water. Thus, water molecules flowing through the tubular objects are ionized by an electrostatic field generated by friction with the electrostatic generator 10. Activated water containing the ions prevents and removes generation of scales and so on in the inside of the tubular objects, and inhibits proliferation of germs, bacteria, etc. included in water. Thus, the water treatment apparatus having the electrostatic generator 10 is non-powered, eco-friendly and simply equipped/installed, thus being of use.

In this manner, the water treatment apparatus finally mounts the housing 40, into which the electrostatic generator 10 is inserted, to the metal casing 50, then directly connecting to the tubular objects.

The metal casing 50, as shown in FIG. 2, includes a cylindrical metal casing body 52 in which the housing 40 and the housing connectors 45 are mounted, and discal metal sealing caps 54 coupled to both sides of the cylindrical metal casing body 52. Here, the center portion of each of the metal sealing caps 54 is provided with a fastening bore 54a, which is adapted to allow one side of each of the housing connectors 45 to be exposed and connected to the tubular objects.

Conventionally, a thermal insulator such as a synthetic resin foam is inserted and filled between the metal casing 50 and the housing 40 to completely isolate heat transmission from the outside, so that the sealing caps 54 of the metal casing 50 prevents the escape of the thermal insulator. Thereby, a sealing structure is obtained.

As set forth above, the prior art inserts and fills the thermal insulator between the metal casing 50 and the housing 40 to isolate heat transmission from the outside. However, it is difficult to compactly fill the thermal insulator so as not to leave any empty space between the metal casing 50 and the housing 40. For this reason, it is impossible to completely isolate heat transmission from the outside by filling the thermal insulator. Thus, even if the thermal insulator is filled, condensed water is inevitably generated in the space between the metal casing 50 and the housing 40 by a temperature difference between the inside and the outside. Further, in the case where the apparatus needs to exchange its components or that to be repaired due to generation of its internal defect, it is difficult to disassembly the apparatus because the thermal insulator is fixedly attached inside the apparatus. Thus, use of the thermal insulator leads to an increase in product costs. Particularly, because the outside of the apparatus has much higher temperature than the inside thereof in the summer, a decrease in pressure according to liquefaction of internal air (moisture), external air accompanied with the moisture continues to be introduced into the apparatus. In this manner, the moisture continuously introduced together with the air is liquefied, so that the condensed water is considerably generated in the summer. The condensed water generated in this manner is frozen in the winter, and thus there is a possibility to spoil the apparatus according to volume expansion. In particular, when the condensed water is accumulated in the apparatus for a long period, the condensed water causes the apparatus to be corroded and to be shortened in its life span. Further, the condensed water leaks from a coupling part of the casing body 52 and the sealing caps 54 or the fastening bore 54a of the sealing caps 54 to the outside, so that an external surface is corroded to generate rust. Eventually, as the condensed water is leaked from a coupling part of the casing body 52 and the sealing caps 54 or the fastening bore 54a of the sealing caps 54 to the outside, a user is compelled to misunderstand that any defect exists in the performance of the apparatus, which leads to a problem in that there is a decrease in reliability of the performance of the apparatus.

DISCLOSURE OF INVENTION

Accordingly, the present invention has been made to solve the above-mentioned problems occurring in the prior art, and an object of the present invention is to provide a water treatment apparatus having drain holes, in which a thermal insulator is kept from being filled, and generated condensed water is naturally discharged, thereby preventing condensed water from being accumulated, facilitating to disassemble the apparatus, preventing corrosion and freezing burst of the apparatus, and promoting reliability of the apparatus.

It is another object to provide a water treatment apparatus having drain holes which can prevent condensed water generated between a metal casing and a housing from being accumulated by naturally discharging the condensed water.

BEST MODE FOR CARRYING OUT THE INVENTION

Hereinafter, a preferred embodiment of the present invention will be described with reference to the accompanying drawings.

Figure 3:
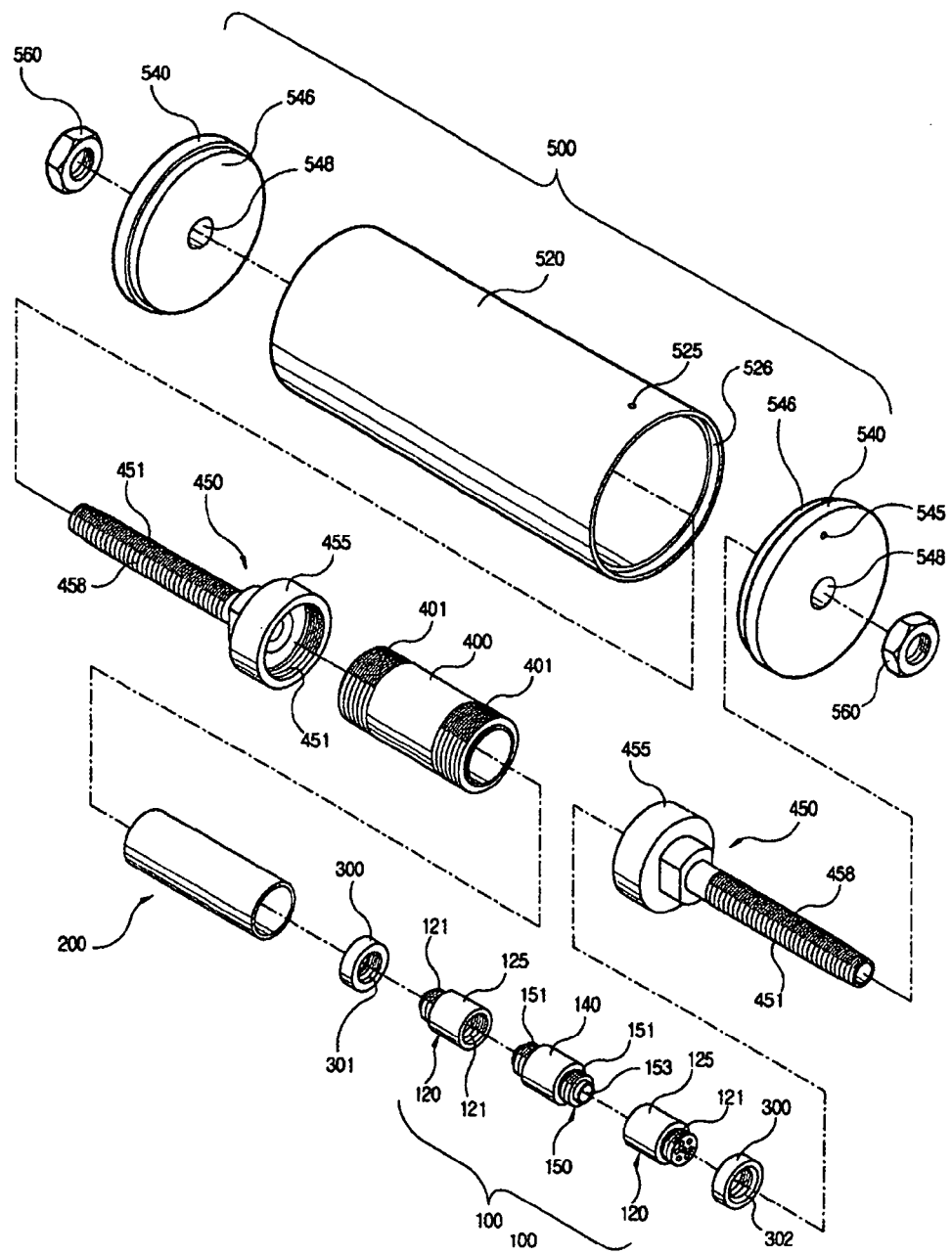
FIG. 3 is an exploded perspective view of an ionized water treatment apparatus according to the present invention.

Referring to FIG. 3, a water treatment apparatus according to one embodiment of the present invention includes a electrostatic generator 100 that generates static electricity, a hollow thermal insulator 200 into which the electrostatic generator 100 is inserted and serves to isolate internal and external heat transmission, closures 300 preventing water from being introduced into the hollow thermal insulator 200, a housing 400 into which the hollow thermal insulator 200 and the closures 300 are inserted, housing connectors 450 each connected at one side to the housing 400 and at the other side to a tubular object, and a metal casing 500 housing the housing 400 and the housing connectors 450 therein, and having a casing body 520 and sealing caps 540, wherein each of the casing body 520 and the sealing caps 540 constituting the metal case 500 has one or more drain holes 525 and 545 formed thereon for naturally discharging condensed water.

Figure 1:
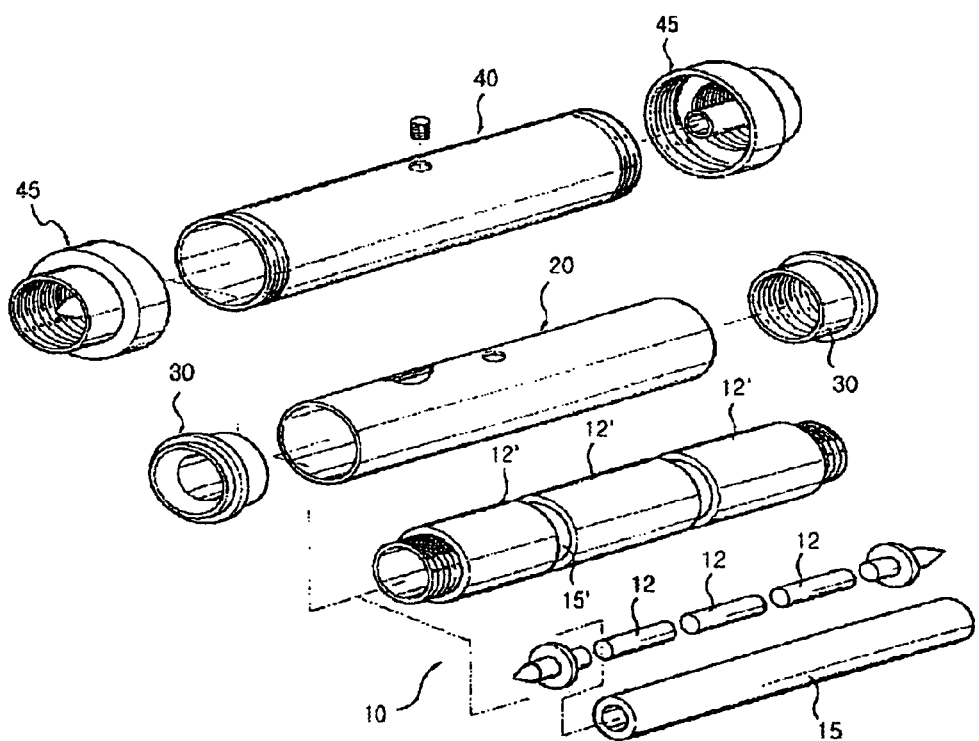
FIG. 1 is a partial exploded perspective view of an ionized water treatment apparatus according to the prior art.
Figure 2:
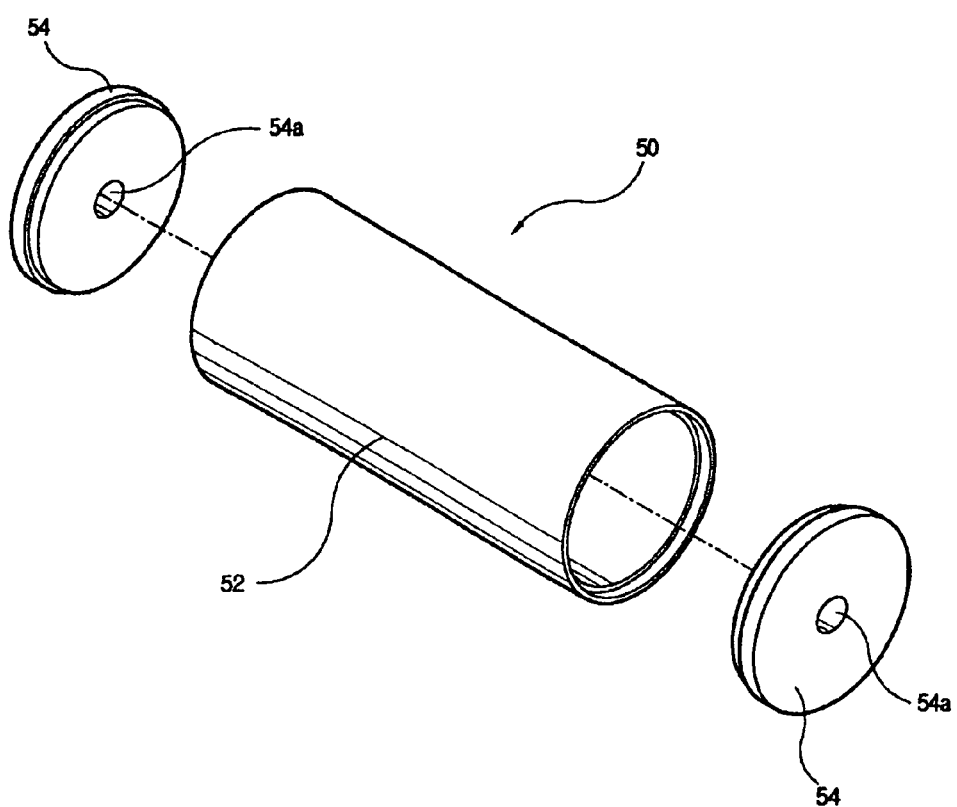
FIG. 2 is an exploded perspective view of a metal casing of an ionized water treatment apparatus according to the prior art.

Here, the electrostatic generator 100 is one capable of generating an electrostatic field through contact friction with water, and may be familiar to those skilled in the art. For instance, the electrostatic generator as shown in FIG. 1 may be used, wherein the rods 12 made of carbon and copper are fitted into the pipe 15, and then the pipe 15 into which the rods 12 are fitted in this manner is inserted into another pipe 15' on which outer circumferential surface another tubes 12' made of carbon and copper are fitted, and thereby an electrostatic field can be generated by friction with the water which is allowed to flow between the inner pipe 15 and the outer pipe 15'.

The hollow thermal insulator 200 serves to prevent performance of the electrostatic generator 100 from being deteriorated depending on generation of moisture by isolating heat transmission from the outside with the electrostatic generator 100 inserted therein, and may makes use of a synthetic resin cylinder capable of securing adiabaticity as usual.

Further, the closures 300 serves to prevent introduction of water into the hollow thermal insulator 200 in connection with the electrostatic generator 100, and may have a normal structure by molding out of synthetic resin.

The housing 400 and the housing connectors 450 are molded out of copper as usual. Generally, the heat insulator 200 and the closures 300 are inserted into the housing 400. Further, each of the housing connectors 450 is connected at one end to the housing 400 and is connected at the other end to the tubular object.

Therefore, the electrostatic generator 100, the thermal insulator 200, the closures 300, the housing 400 and the housing connectors 450, all of which constitute the water treatment apparatus of the present invention, have a structure familiar to those skilled in the art. However, in order to protect these components from external shocks as well as to completely isolate heat transmission against the outside, the housing 400 and the hosing connectors 450 are housed in the metal casing 500. Further, the metal casing 500 has drain holes 525 and 545 formed thereon. In other words, the present invention is characterized in that, to naturally discharge condensed water which is inevitably generated between the housing 400 and the metal casing 500, the drain holes 525 and 545 are formed on the casing body 520 and sealing cap 540, so that it is possible not only to exclude filling of a separate thermal insulator to facilitate disassembly of the apparatus, but also to prevent accumulation of the condensed water to avoid from corrosion and freezing burst of the apparatus. The present invention is further characterized in that the condensed water generated between the housing 400 and the metal casing 500 is naturally dried by external air introduced through the drain holes 525 and 545 to prevent accumulation of the condensed water.

Further, the present invention provides the economical water treatment apparatus having a firmly assembled structure, in which the metal casing 500 is provided with the drain holes 525 and 545, thus increasing an area in contact with water to enhance efficiency of water treatment. The water treatment apparatus will be described in detail with reference to the attached drawings as follows.

Figure 4:
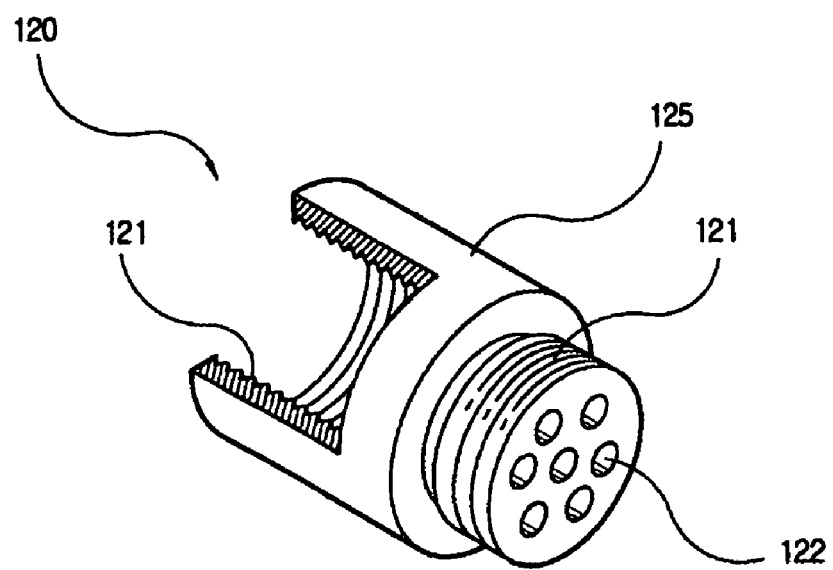
FIG. 4 is a partial sectional perspective view of carbon cylindrical bodies constituting an ionized water treatment apparatus according to the present invention.

As shown in FIG. 3, the electrostatic generator 100 includes a zinc tube 140 located in the center thereof, two carbon cylindrical bodies 120 disposed at both sides of the zinc tube 140, and a pipe 150 to which the carbon cylindrical bodies 120 and the zinc tube 140 are coupled to be disposed in the order of a first carbon cylindrical body 120, the zinc tube 140 and a second carbon cylindrical body 120. The pipe 150 is molded out of synthetic resin, and has a hollow passage 153 in the inside thereof so as for water to flow through and a male thread 151 on an outer circumferential surface thereof so as for the carbon cylindrical bodies 120 and the zinc tube 140 to be coupled. The zinc tube 140 is provided with a female thread on an inner circumferential surface thereof and is engaged with the middle portion of the pipe 150 as shown. Further, as shown in FIG. 4, for each of the carbon cylindrical bodies 120, one side is provided with a male thread 121 on an outer circumferential surface thereof to be engaged with each of the closures 300 and has a comb structure formed with a plurality of water through holes 122 to facilitate generation of static electricity, and the other side has an extension 125, on an inner circumferential surface of which a female thread 121 is formed to be engaged with the pipe 150.

Figure 5:
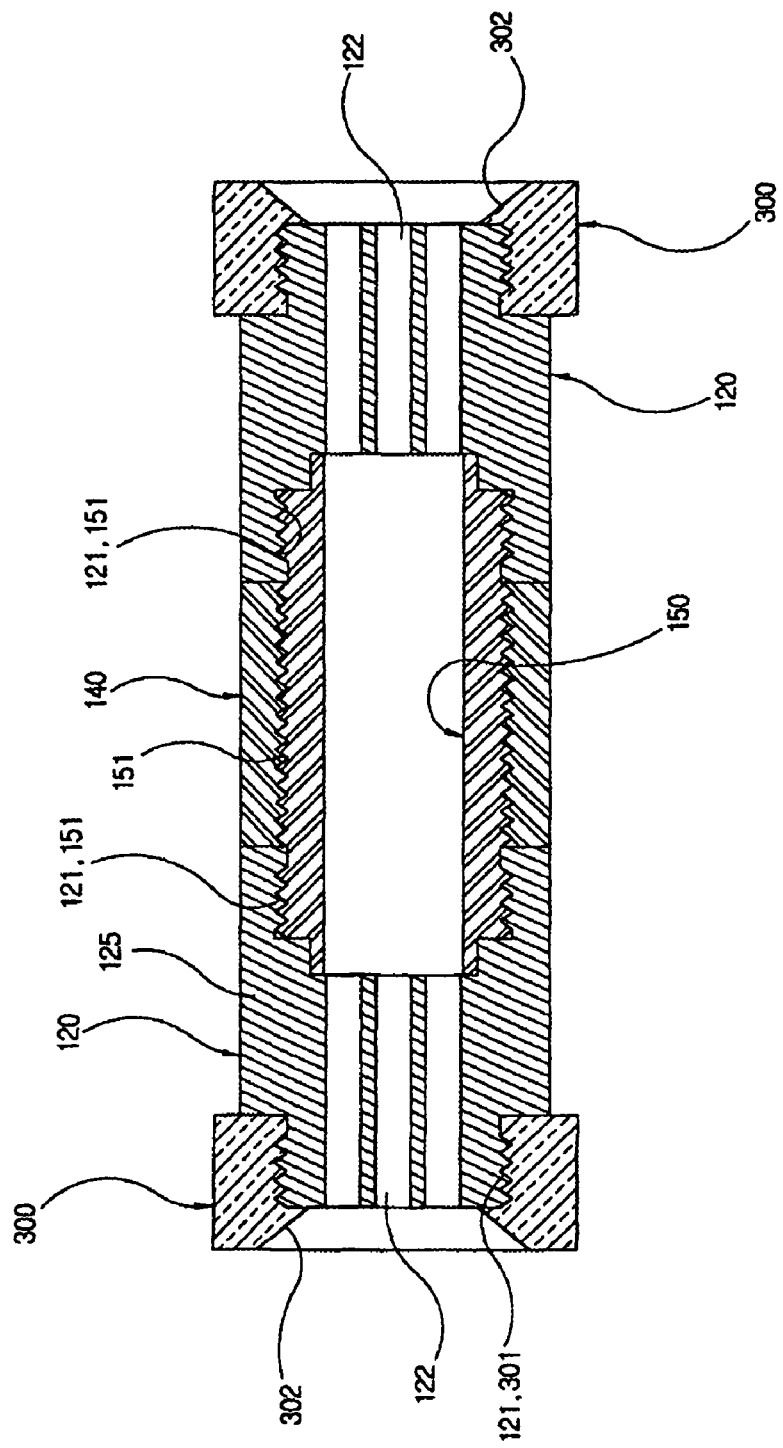
FIG. 5 is a cross-sectional view of a state of coupling an electrostatic generator and closures constituting an ionized water treatment apparatus according to the present invention.

Now, referring to FIG. 5, when the carbon cylindrical bodies 120 come into contact with water, due to friction at the contact surface between each of the carbon cylindrical bodies 120 and the water, static electricity is generated. While the static electricity is charged on each carbon cylindrical body 120 with a positive polarity and is discharged toward the zinc tube 140 with a negative polarity, a narrow electrostatic field with a high potential is established between each carbon cylindrical body 120 and the zinc tube 140 in a direction perpendicular to flow of the water. The water ($H_2O$) is ionized into a hydrogen ion ($H^+$) and a hydroyl ion ($OH^-$). Here, the carbon cylindrical bodies 120 have the comb structure formed with the plurality of water through holes 122, so that the carbon cylindrical bodies 120 have a wide area contacting the water, thus generating much quantity of static electricity.

In this manner, because decomposition of its molecular structure causes the decomposed ions to rotate more rapidly, the ionized water is converted into strongly activated water. This activated water causes active oxygen to be adsorbed into the water molecular structure, so that an activation force of the oxygen resulting from corrosion of the tubular object is weakened to inhibit generation of rust. Further, the activated water generates a force attracting oxygen into the water, so that a reduction reaction changing hematite ($Fe_2O_3$) into magnetite ($Fe_3O_4$) is generated to get the rust off.

Each of the closures 300 is molded out of synthetic resin, one side of which is provided with a female thread 301 on an inner circumferential surface thereof to be engaged with the thread 121 of each carbon cylindrical body 120, and the other side is formed with a slant surface 302 allowing water to be easily introduced into the electrostatic generator 100, particularly, the carbon cylindrical bodies 120. Here, an elastic seal (not shown) such as a typical O-ring is fitted between the closures 300 and the carbon cylindrical bodies 120 and between the carbon cylindrical bodies 120 and the pipe 150 so as for water to flow inside the electrostatic generator 100 alone and not to leak outside between the closures 300 and the carbon cylindrical bodies 120.

In this manner, the assembled component of the electrostatic generator 100 and the closures 300 is inserted into the hollow thermal insulator 200. The hollow thermal insulator 200 is a cylindrical body molded to have the same inner diameter as the outer diameter of the closures 300 using synthetic resin, such as polyvinyl chloride, ploytetrafluoro ethylene called "Teflon" or the like, and is subjected to surface treatment to have fine naps on the surface thereof. This surface treatment functions to buffer the electrostatic generator 100 and the housing 400, and at the same time to bring the hollow thermal insulator 200 into close contact with the closures 300 and the housing 400 when the hollow thermal insulator 200 is fitted between the closures 300 and the housing 400.

The housing 400 is molded out of copper to have the same inner diameter as the outer diameter of the hollow thermal insulator 200, both sides of which are provided with male threads 401 on outer circumferential surfaces thereof so as to be engaged with the housing connectors 450. Each of the housing connectors 450 includes an extension 455 at one side thereof and a fastener 458 at the other side thereof, both of which are integrally formed, wherein the extension 455 is provided with a female thread 451 on an inner circumferential surface thereof so as to be engaged with the housing 400, and the fastener 458 is provided with a male thread 461 on an outer circumferential surface thereof so as to be engaged with the tubular object. As shown, the fastener 458 is preferably formed to have the outer diameter decreased toward the tubular object in order to facilitate to be inserted into and engaged with the tubular object. The housing connectors 450 are molded out of copper, and are assembled in the state where the hollow thermal insulator 200 into which the electrostatic generator 100 and the closures 300 are fitted is inserted into the housing 400. Further, in order to prevent water from being leaked between the closures 300 and the housing connectors 450, the elastic seal (not shown) is fitted on contact surfaces between the closures 300 and the housing connectors 450.

The metal casing 500 consists of a cylindrical metal casing body 520 and a discal metal sealing caps 540 coupled to both sides of the metal casing body 520, wherein each of the sealing caps 540 is provided with a fastening bore 548 on the center portion thereof so that the fastener 458 of each of the housing connectors 450 passes through the fastening bore 548 to be exposed outside and coupled. In order for the metal casing body 520 and the sealing caps 540 to be easily coupled to each other, both sides of the metal casing body 520 are formed with a coupled groove 526 on an inner circumferential surface thereof. In correspondence to this, each of the sealing caps 540 is formed with a coupling projection 546. Further, according to the present invention, the metal casing body 520 and the sealing caps 540 are provided with one or more drain holes 525 and 545, in order to naturally discharge condensed water, which is generated in an internal space between the metal casing 500 and the housing 400 due to a temperature difference between the internal space and the outside. The drain holes 525 and 545 may be formed on only the metal casing body 520 or only the sealing caps 540, and preferably on both the metal casing body 520 and the sealing caps 540 as shown in the drawings. This allows condensed water to be discharged not only through the drain hole 525 formed on the metal casing body 520 when the water treatment apparatus according to the present invention is installed horizontal to the ground surface, but also through the drain hole 545 formed on each of the sealing caps 540 when the water treatment apparatus according to the present invention is installed perpendicular to the ground surface.

By mounting the assembly of the housing 400 and the housing connectors 450 in the metal casing body 520, inserting the fasteners 458 of the housing connectors 450 into the fastening bores 548 of the sealing caps 540, and then screwing the fasteners 458 of the housing connectors 450 with fastening members 560 such as a nut, assembling of the water treatment apparatus is completed. This assembled water treatment apparatus is shown in FIG. 6 in a longitudinal cross-sectional view.

Figure 6:
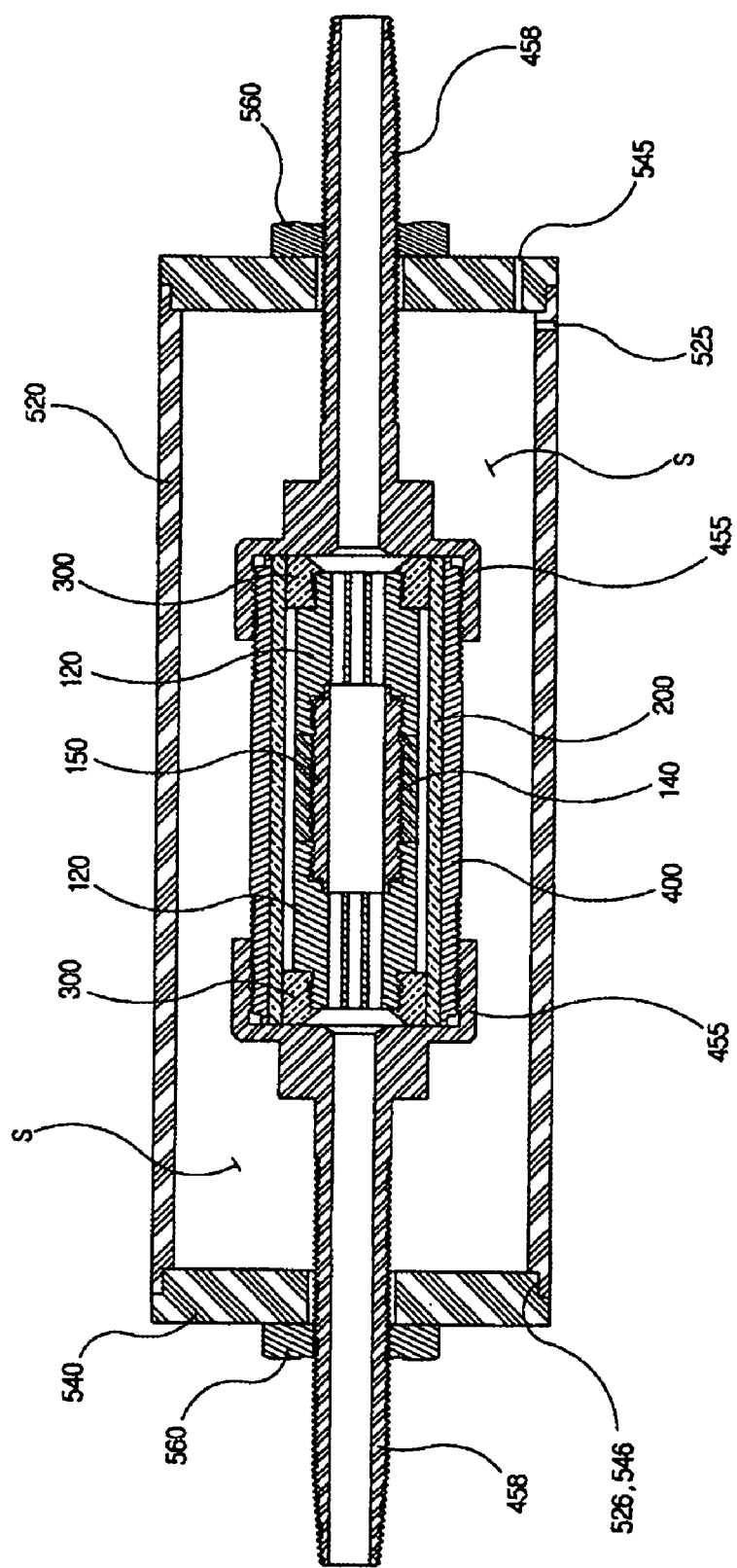
FIG. 6 is a longitudinal cross-sectional view of an ionized water treatment apparatus according to the present invention, in which the ionized water treatment apparatus of FIG. 3 is assembled.

Thus, as shown in FIG. 6, the water treatment apparatus according to the present invention is capable of widening the contact area with the water to enhance the efficiency of water treatment, has the firmly assembled structure, and naturally discharge condensed water, which is generated in the empty space between the metal casing 520 and the housing 400, through at least one of the drain holes 525 and 545.

Figure 7:
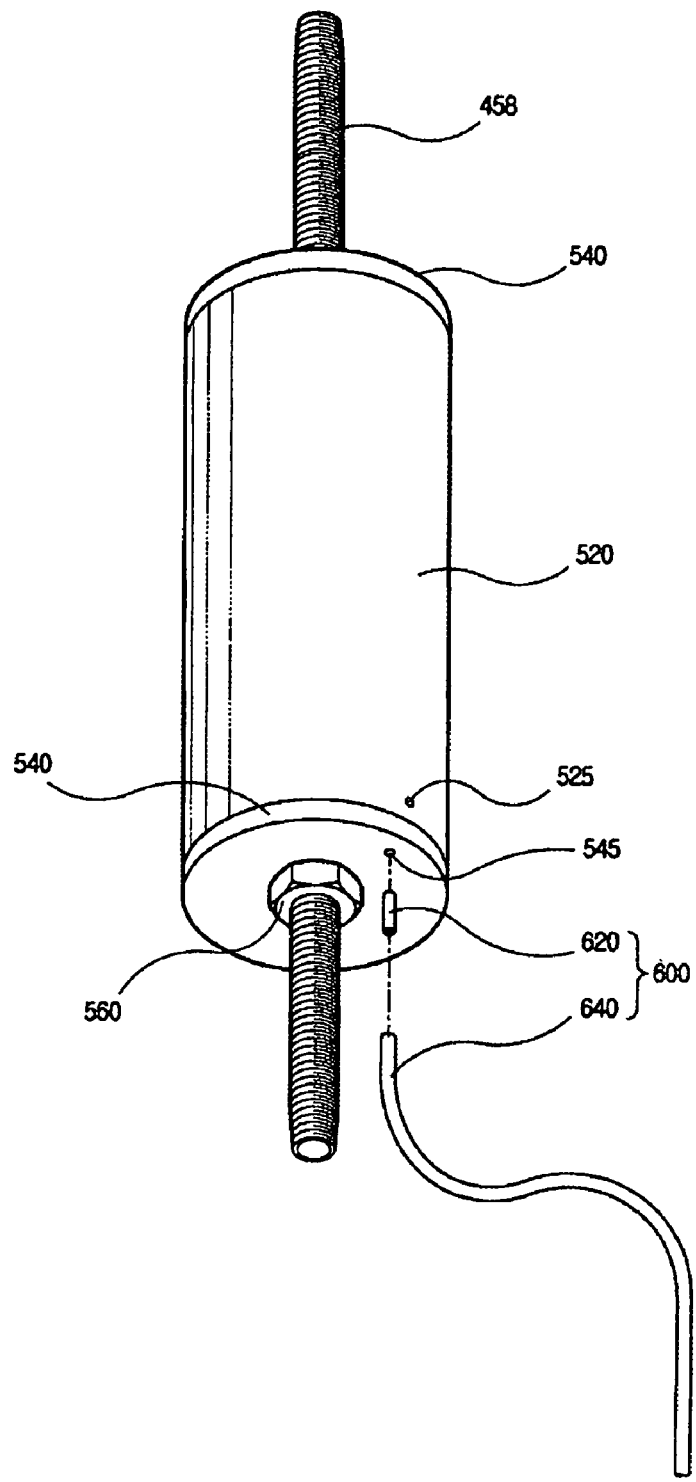
FIG. 7 illustrates another embodiment of an ionized water treatment apparatus according to the present invention, in which a metal casing is provided with a drain trap.

Further, as shown in FIG. 7, in the water treatment apparatus according to the present invention, a drain trap 600 consisting of a coupling element 620 and a drain tube 640 may be coupled to at least one of the drain holes 525 and 545. When the water treatment apparatus of the present invention is installed in a building, because it is not good from the viewpoint of beautiful sight that the condensed water is discharged through the drain holes 525 and 545, the drain trap 600 is intended to discharge condensed water outside the building or collect condensed water into a bath using the drain tube 640. The coupling element 620 can hermetically couple the drain tube 640 with the drain hole 525 or 545 so as for the condensed water discharged through the drain hole 525 or 545 to be introduced into only the drain tube 640 without any leakage. As shown in FIG. 7, the coupling element 620 includes one, as a tube form having a small diameter, capable of being integrally coupled with the drain hole 525 or 545, or one such as silicon capable of closely coupling the drain tube 640 to the drain hole 525 or 545.

Thus, one side of the drain tube 640 is coupled to the drain hole 525 or 545 by the coupling element 620, and the other side is branched outside the building or connected to the bath, so that the condensed water can be prevented from being discharged in the building.

As mentioned above, with the water treatment apparatus of the present invention, the activated water prevents the rust from being generated. Further, the finely decomposed ions of water molecules are bonded with atoms or molecules in water to intend to become large molecules, thus having a resolution force approaching the pure. Thus, the ions, $H^+$ and $OH^-$, of water molecule are smoothly resolved into various non-organic and organic substances in water to peel off foreign matters or scales attached to the inner surface of the tubular object, so that it is possible to inhibit proliferation of harmful germs, bacteria, etc. contained in water. In addition, the water treatment apparatus does not require electric power and is an eco-friendly apparatus. Further, activated water molecules (activated water) containing ions accelerate penetration and absorption toward cells of animals including human beings because cluster (a group of molecules) is sub-divided to rotate at a rapid speed. In case of human beings and animals, the activated water contributes to growth promotion of a living body and activation of the electrolyte, and rapidly removes various heavy metals and waste products to supply necessary nutrition into the human body in balance.

In particular, in the case where the water processed by the water treatment apparatus according to the present invention is supplied to animals in the livestock farming industry, nutrition contained in forage is smoothly absorbed, so that it is possible to improve a quality of flesh, to promote growth, to reduce a death rate according to inhibition of virus infection, and to save the forage.

Further, in the case where the water processed by the water treatment apparatus according to the present invention is supplied to plants, bonds between water molecules are minutely cut off to weaken surface tension, so that the water is well absorbed through root hairs of each plant. Thus, fertilizer and nutrition components resolved in water are well absorbed at the same time to enhance a growth speed of the plants and so forth.

The following Table 1 represents mean weights of twelve piglings to which "ionized water" which passes through the water treatment apparatus of the present invention and "non-ionized water" which does not pass through the water treatment apparatus are each supplied for 70 days.

TABLE 1

Comparison of growth of piglings

| comparison | weight of piglings |
|---|---|
| Ionized water | 58.28 Kg (mean weight of twelve piglings) |
| non-ionized water | 51.23 Kg (mean weight of twelve piglings) |

The follow Table 2 represents forage demands needed to increase a weight of a pig by 1 Kg. To be more specific, a quantity of forage used to increase the weight of the pig by 1 Kg by each supplying "ionized water" which passes through the water treatment apparatus of the present invention according to the structure of FIG. 6 and "non-ionized water" which does not pass through the water treatment apparatus.

TABLE 2

Comparison of forage demands

| comparison | forage demands needed to increase a weight of a pig by 1 Kg |
|---|---|
| ionized water | 2.20 Kg |
| non-ionized water | 2.46 Kg |

As shown in Tables 1 and 2, it can be seen that the mean weight of twelve piglings supplying the "ionized water" was increased by about 14%, and that the forage demand was decreased by about 10%.

The following Table 3 is to compare productivities between an 'example house' supplying "ionized water" which passes through the water treatment apparatus of the present invention according to the structure of FIG. 6 and a 'comparison house' supplying "non-ionized water" which does not pass through the water treatment apparatus with respect to middle-size fowls which are bred for 26 weeks in a poultry farm. In Table 3, enlisted fowl head (A) is the number of fowls which are bred for 26 weeks after hatched at the 'example house' and the 'comparison house' and total egg production number (B) is the total number of eggs which the enlisted fowls lay from birth to death at each house, total hatchable egg production number (D) is the total number of eggs which exclude defective eggs from the total egg production number (B) and can be hatched into chicks and have a good state and culling fowl head (F) are the number of fowls which are survived except for the number of fowls which are perished at each house, and hatched egg number (H) is the number of chicks which are healthily hatched among the total final eggs.

Egg production index (C), hatchable egg production index (E), survival rate (G) and hatched egg index (I) each are values calculated by the following mathematic equations 1 to 4:

Egg production index $(C)$=Total egg production number $(B)\times 100$/Enlisted fowl head $(A)$    Equation 1, Hatchable egg production index (E)=Total hatchable
egg production number (D)×100/Enlisted fowl
head (A)                                                    Equation 2, Survival rate (G)=Culling fowl head (F)×100/En-
listed fowl head (A)                                        Equation 3, and Hatched egg index I=Hatched egg number H/En-
listed fowl head A×100                                      Equation 4.

from the measurement values of $31^{st}$ day that the onions cultivated with the "ionized water" showed a growth rate of 24% for the leaf length and 13% for the leaf bud number. Here, the reason why the growth rate of $31^{st}$ day is less than that of $24^{th}$ day is considered that nutrient solution is not supplied, and that length growth slowed down due to volume growth.

TABLE 3

Productivity comparison of middle-size fowls

| Class. | enlisted fowl head (A) | total egg production number (B) | egg production index (C) | total hatchable egg production number (D) | hatchable egg production index (E) |
|---|---|---|---|---|---|
| A* | 8.954 | 1,261,680 | 140.9% | 1,156,608 | 129.2% |
| B* | 8.986 | 1,301,710 | 144.9% | 1,185,993 | 132.0% |

| Class. | culling fowl head F | survival rate G | hatched egg number H | hatched egg index I |
|---|---|---|---|---|
| A* | 6.366 | 71.1% | 875,700 | 97.8 |
| B* | 6.505 | 72.4% | 927,300 | 103.2 |

Note:
A* indicates a house according to a comparative example.
B* indicates a house according to the invention.

As shown in Table 3, it can be seen that the 'example house' supplying "ionized water" was remarkably excellent in the egg production index (C), the hatchable egg production index (E), the survival rate (G) and the hatched egg index (I) compared with the 'comparison house'. Here, the hatched egg index (I) refers to the number of chicks are healthily hatched from a mature fowl, and thus it can be seen that the example house (103.2 head) produced more 5.4 head per fowl than the comparison house (97.8 head), thus having good productivity.

The following Table 4 represents $24^{th}$ and $31^{st}$ day's growth speeds of onions A, B and C cultivated by exchange of "ionized water" which passes through the water treatment apparatus of the present invention according to the structure of FIG. 6 at a constant time every day and by exchange of "first-class underwater" which is typically used in a floriculture farm at a constant time every day. Here, the hydroponic cultivation is carried out by supplying only water without adding a nutrient solution.

The measurement results shown in Tables 1 to 4 were obtained from one water treatment apparatus. However, in the case where a plurality of electrostatic generators 100 are housed in the water treatment apparatus, or a plurality of water treatment apparatuses are connected in series, more enhanced effects can be accomplished.

INDUSTRIAL APPLICABILITY

The present invention naturally discharges condensed water generated in the empty space S between the metal casing 500 and the housing 400 through the drain holes 525 and 545, thus preventing accumulation of the condensed water to escape corrosion and freezing burst of the apparatus. Further, by excluding filling up of the heat insulator as in the prior art, it is possible to easily disassemble the apparatus and to prevent cost increase accused by use of the thermal insulator.

TABLE 4

Growth speed comparison of onion groups A, B and C

| | $24^{th}$ day in test | | | | $31^{st}$ day in test | | | |
| | ionized water | | First-class ground water | | ionized water | | first-class ground water | |
| Class. | Leaf length (cm) | leaf bud (No) | Leaf length (cm) | leaf bud (No) | leaf length (cm) | leaf bud (No) | leaf length (cm) | leaf bud (No.) |
|---|---|---|---|---|---|---|---|---|
| A | 31 | 15 | 24 | 11 | 52.5 | 20 | 46.5 | 18 |
| B | 40 | 15 | 21 | 8 | 55.5 | 18 | 41.0 | 14 |
| C | 18 | 9 | 18 | 9 | 43.0 | 14 | 34.0 | 14 |
| mean | 30 | 13 | 21 | 9.3 | 50.3 | 17.3 | 40.5 | 15.3 |

It can be seen from the measurement values of $24^{th}$ day in Table 4 that the onions cultivated with the "ionized water" showed very excellent growth rate of 43% for the leaf length and 40% for the leaf bud number. Further, it can be seen Particularly, the present invention makes the drain holes 525 and 545 to be incorporated into components of the apparatus and then makes the condensed water to be discharged through the incorporated drain holes 525 and 545.

Thereby, there is nothing to cause a user to misunderstand that any defect in the performance of the apparatus is present as in the prior art, so that it is possible to promote reliability in the performance of products.

Further, the present invention exerts effect of preventing accumulation of condensed water because external air is introduced through the drain holes 525 and 545 to naturally dry the empty space S between the metal casing 500 and the housing 400.

In addition, the present invention naturally discharges the generated condensed water through the drain holes 525 and 545, widens the contact area with water, and has the firm assembly structure, so that it is possible to obtain good performance and simple and convenient assembling capability, particularly to contribute toward improvement of productivity and quality through application to the livestock farming industry, to save a quantity of forage, and to facilitate a growth rate of plants.

The invention claimed is:

1. A water treatment apparatus comprising:
    an electrostatic generator for generating static electricity;
    a hollow thermal insulator into which the electrostatic generator is inserted, for isolating internal and external heat transmission;
    closures for preventing water from being introduced into the hollow thermal insulator;
    a housing into which the hollow thermal insulator and the closures are inserted;
    housing connectors each connected at one end to the housing and connected at the other end to a tubular object; and
    a metal casing for housing the housing and the housing connectors therein, and having a casing body and sealing caps, wherein at least one of the casing body and the sealing caps constituting the sheath metal casing has at least one drain hole formed thereon for naturally discharging condensed water.

2. The water treatment apparatus as set forth in claim 1, wherein the electrostatic generator includes a pipe which has a thread formed on an outer circumferential surface thereof and to which a first carbon cylindrical body, a zinc tube and a second carbon cylindrical body are coupled in order thereof, one side of the respective carbon cylindrical body having a comb structure formed with a plurality of water through holes and being provided with a male thread on an outer circumferential surface thereof to be engaged with each of the closures, the other side of the respective carbon cylindrical body having an extension and being provided with a female thread on an inner circumferential surface thereof to be engaged with the pipe;
    one side of the respective closure is provided with a female thread on an inner circumferential surface thereof to be engaged with any one of the carbon cylindrical bodies, and the other side of the respective closure is formed with a slant surface;
    the hollow thermal insulator is provided with fine naps on the surface thereof and allows the electrostatic generator and the closures to be inserted therein; and
    each of the housing connectors includes an extension at one side thereof and a fastener at the other side thereof, the extension and the fastener being integrally formed, the extension being provided with a female thread on an inner circumferential surface thereof so as to be engaged with the housing, the fastener being provided with a male thread on an outer circumferential surface thereof so as to be engaged with the tubular object.

3. The water treatment apparatus as set forth in claim 2, wherein the drain hole is coupled to a drain trap having a coupling element and a drain tube.

4. The water treatment apparatus as set forth in claim 1, wherein the drain hole is coupled to a drain trap having a coupling element and a drain tube.

* * * * *